J. ESKELIN.
TRACTOR.
APPLICATION FILED JULY 22, 1919.

1,370,297.

Patented Mar. 1, 1921.
3 SHEETS—SHEET 1.

Jacob Eskelin.
Inventor

Lancaster and A. Moore
his Attorneys

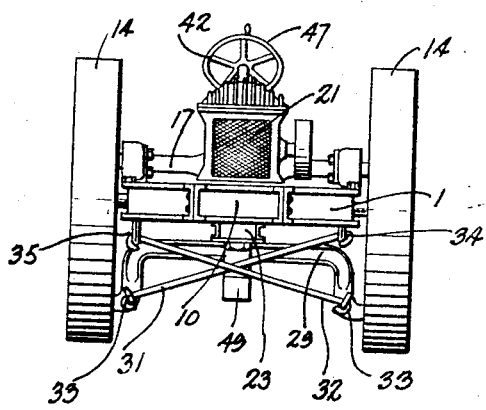
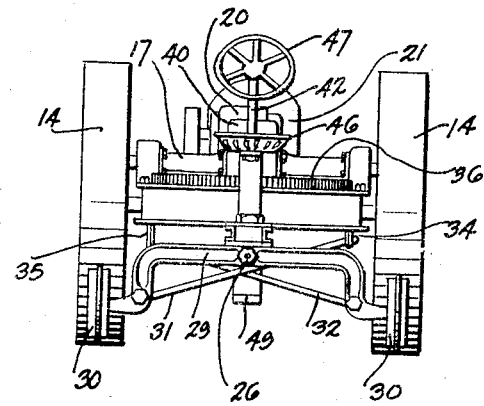
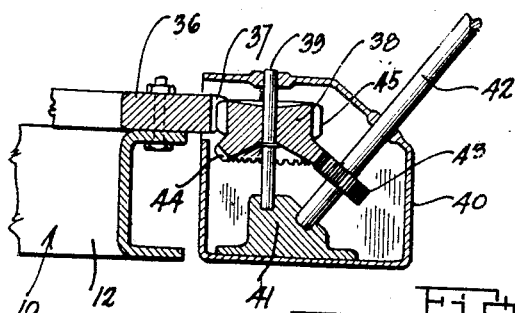

UNITED STATES PATENT OFFICE.

JACOB ESKELIN, OF CHICAGO, ILLINOIS, ASSIGNOR OF ONE-HALF TO ALBERT B. PLATER, OF CHICAGO, ILLINOIS.

TRACTOR.

1,370,297.  Specification of Letters Patent.  Patented Mar. 1, 1921.

Application filed July 22, 1919. Serial No. 312,510.

*To all whom it may concern:*

Be it known that I, JACOB ESKELIN, a citizen of the United States, residing at Chicago, in the county of Cook and State of Illinois, have invented certain new and useful Improvements in Tractors, of which the following is a specification.

This invention relates to tractors, and an object of the invention is to provide a front wheel guide tractor in which the power is transmitted to the front guide wheels of the tractor, from an ordinary approved type of internal combustion engine, through the medium of speed change gears and a differential gear set to permit the controlling of the speed of travel of the tractor; to provide means whereby the four wheels of the tractor will be steered in unison, increasing the traction of the tractor and eliminating to a material extent side drafts upon the tractor, by providing a complete three point suspension.

Another object of the invention, is to provide in a tractor as specified, a main supporting frame having side frames attached thereto which assist the main frame in supporting the traction wheel supporting axle, and to which main frame, a rear frame is pivotally connected, to which rear frame, the rear axle structure is connected, through the medium of an L bolt, to permit limited pivotal movement of the axle structure about both a vertical and horizontal axis, and further to provide cross rods which connect the rear axle structure to the main supporting structure to steer the rear wheels in unison with the steering of the front wheels of the tractor.

A still further object of this invention is to provide a rack upon the rear end of the main supporting frame, with which a gear meshes, the said gear being rotated by the rotation of a steering post, and by means of which rack, gear and steering post the tractor is steered or guided.

Other objects of the invention will appear in the following detailed description taken in connection with the accompanying drawings, forming a part of this specification, and in which drawings:

Fig. 3 is a front elevation of the tractor.

Fig. 4 is a rear elevation of the tractor.

Fig. 5 is a detail section through the tractor illustrating the steering mechanism.

Figure 6:
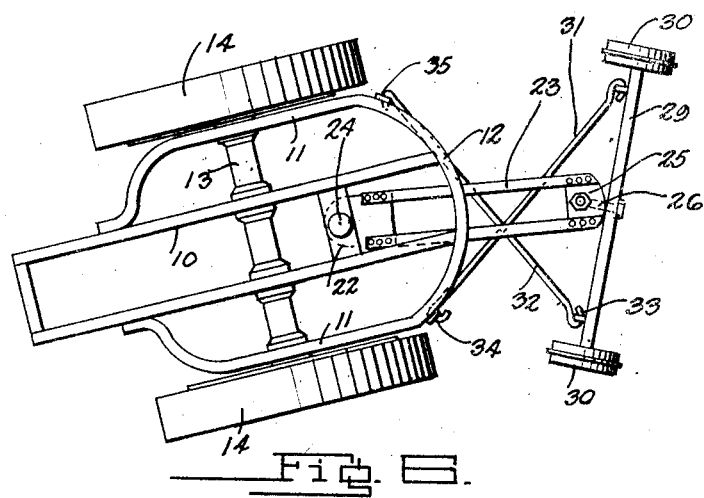
Fig. 6 is a top plan of the chassis.

Referring more particularly to the drawings, wherein like characters indicate like and corresponding parts throughout the several views, 10 indicates the main supporting frame of the tractor which is substantially rectangular in shape, having a pair of parallel extending side members extending centrally through the main chassis of the tractor, and a second pair of parallel side members 11 spaced laterally from the central side members and having their rear ends connected by an arcuate link 12 of the channel iron of which the side extensions of the frame is formed. The forward ends of the side members 11 are curved inwardly and attached to the central guide rails in any suitable manner as indicated in Fig. 6 of the drawings.

The parallel side members of the frame 10 rotatably support the front axle 13 upon which the traction wheels 14 of the tractor are rotatably mounted. These traction wheels 14 carry bull gears 15 with which pinions 16 mesh. The pinions 16 are mounted, one upon each end of the drive axle structure 17 which is connected through the medium of an approved type of differential gears as indicated at 18, through a speed change gear set 19 of approved type with the engine or motor 20 of the tractor. This engine or motor 20 may be of any approved type of internal combustion engine, and it of course has the usual type of clutch mechanism associated therewith, and embodies the cooling system, the cooling liquid from which passes through a radiator 21 carried upon the forward end of the chassis or frame 10 of the said tractor.

Figure 7:
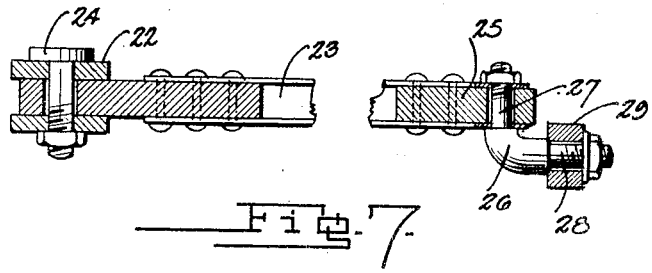
Fig. 7 is a detail section of a part of the tractor frame, illustrating the manner of connecting the rear axle structure to the tractor frame.

The supporting frame 10 has a cross bar 22 carried thereby near its rear end, to which the rearwardly extending frame 23 is pivotally connected by means of a king bolt 24. The frame 23 has a plate 25 at its rear end, through which the vertically extending portion of an angled or L bolt 26 extends. This bolt 26 preferably has the portion 27 thereof which extends through the plate 25 reduced in diameter, with respect to the portion below the plate 25, as clearly shown in Fig. 7 of the drawings, so as to prevent an improper binding action between the frame 23 and the angle of the bolt 26, during operation, and also so as to permit of limited pivotal movement of the bolt 26 with respect to the frame 23 upon a vertical axis. The horizontal end 28 of the bolt 26 is also reduced in diameter with respect to the angled portion of the bolt and it extends, rotatably through the rear axle 29, so as to permit pivotal movement of this axle 29 upon a horizontal axis, as well as a vertical axis, which pivotal movement upon a vertical axis is permitted through the rotation of the reduced vertical portion 27 of the bolt in the plate 25. The axle 29, has supporting wheels 30 upon its spindle end, which track with the front traction wheels 14. The axle 29 has crossed rods 31 and 32 connected thereto in any suitable manner, preferably by means of a hook and eye connection as shown at 33, so as to permit limited independent movement of the rods and axle, and these rods, cross intermediate their ends, and are connected, at their forward ends to depending bars 34, and 35, respectively. The bar 35 is preferably longer than the bar 34, so as to permit movement of the rods without interference one with respect to the other. These bars 34 and 35 are attached to and depend from the rear arcuate portion 12 on the chassis of the tractor.

Figure 1:
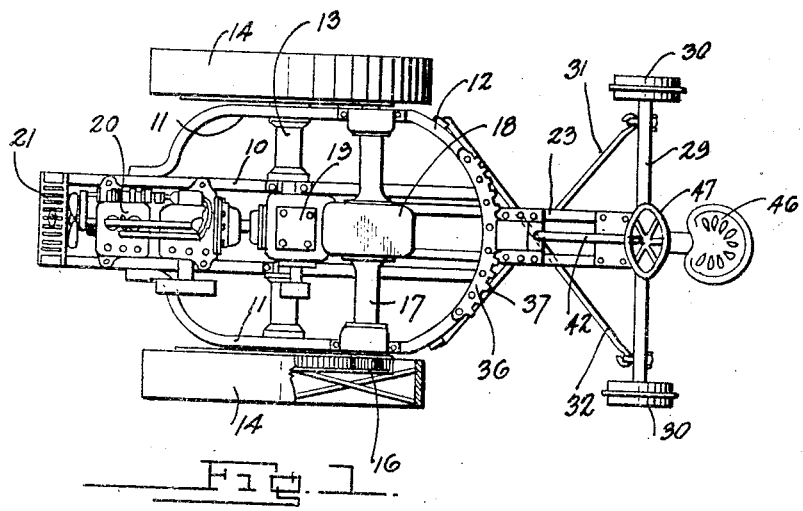
Figure 1 is a top plan of the improved tractor.
Figure 2:
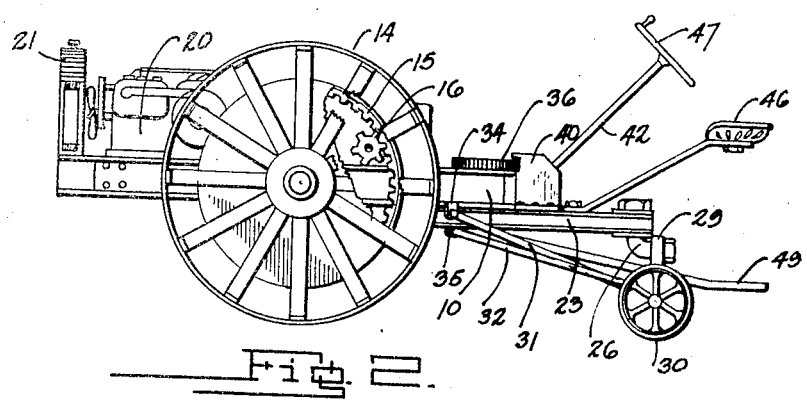
Fig. 2 is a side elevation of the improved tractor having parts broken away.

The arcuate rear end 12 of the frame of the tractor has a segmental rack 36 attached to the upper surface thereof, the teeth 37 of which extend rearwardly as clearly shown in Figs. 1 and 5 of the drawings. The teeth 37 of the rack 36 mesh with the teeth of a gear 38, which is mounted upon a suitable shaft 39, carried by bearings which are formed upon and mounted in a suitable gear housing 40. The lower end of the shaft 39 is mounted in a bearing structure 41 which is carried within the housing 40 as clearly shown in Fig. 5 of the drawings, and this bearing block is also provided with a bearing which receives the lower end of the angular rearwardly extending gear post 42. The gear 43 is mounted upon the steering post 42 and meshes with the inclined teeth 44, which are formed upon the gear 38. As clearly shown in Fig. 5 of the drawings, the gear 38 is provided with a peripheral set of straight gear teeth 45 which mesh with the rack teeth 37 and with an inclined set of teeth 44 formed upon the substantially conical downwardly extending portion of the gear 38 and which teeth 44 mesh with the gear 43. The steering post 42 extends rearwardly and in close proximity to the seat 46, of the tractor structure and it has the usual form of hand wheel 47 mounted thereon, by means of which the operator of the tractor can conveniently rotate the steering post 42 from the seat 46, to steer the tractor, which steering is obtained through the movement of the supporting frame 12, and consequently of the traction wheels 14 under the meshing engagement of the gears, 43, 38 and the rack teeth 37.

The usual form of draw bar 49 is attached to the frame in the usual manner and by means of this draw bar, any desired implement to be drawn by the tractor structure may be hitched thereto. By reference to the drawings, it will be noted that a tractor has a three point suspension, namely the axis of the two traction wheels 14 and through the bolt 22, thereby eliminating to a material extent side drafts upon the tractor.

Changes in details may be made without departing from the spirit of this invention, but;

I claim:

1. In a tractor, the combination of a main frame, a front axle carried thereby, traction wheels on said front axle, a motor carried by the frame, power transmission means connecting said motor and traction wheels, a rearwardly extending auxiliary frame pivoted to said main frame, a rear axle connected to the rear end of said auxiliary frame and an L shaped bolt for permitting vertical and horizontal pivotal movements between the said rear end of the auxiliary frame and the rear axle.

2. In a tractor, the combination of a main frame, a cross bar carried by said frame near its rear end, an auxiliary frame pivotally connected to said cross bar, a rear axle, and an elbow pivotally connected to the rear end of said auxiliary frame, and pivotally connecting said rear axle to the auxiliary frame.

3. In a tractor, the combination of a main frame, a cross bar carried by said frame near its rear end, an auxiliary frame pivotally connected to said cross bar, a rear axle, an elbow pivotally connected to the rear end of said auxiliary frame and pivotally connecting said rear axle to the auxiliary frame, and crossed bars connected to said rear axle structure and having their front ends connected to said main frame.

4. In a tractor, the combination of a main frame, a front axle carried thereby, traction wheels on said front axle, a motor carried by the frame power transmitting means connecting said motor and traction wheels, a cross bar carried by said frame near its rear end, an auxiliary frame pivotally connected to said bar and extending rearwardly of the main frame, a rear axle connected to the rear end of said auxiliary frame, for limited pivotal movement about a vertical and horizontal axis, relative to the frame, and crossed bars connected to said rear axle and to said main frame.

5. In a tractor, the combination of a main frame, a front axle carried thereby, traction wheels on said front axle, a motor carried by the frame, power transmitting means connecting said motor and traction wheels, a cross bar carried by said frame near its rear end, an auxiliary frame pivotally connected to said bar and extending rearwardly of the main frame, a rear axle connected to the rear end of said auxiliary frame, for limited pivotal movement about a vertical and horizontal axis, relative to the frame, crossed bars connected to said rear axle and to said frame, and means carried by said rear auxiliary frame and adapted for coaction with companion means carried by the main frame for steering the tractor.

6. In a tractor, the combination of a main frame, a cross bar carried by said main frame near its rear end, a rearwardly extending auxiliary frame pivotally connected to said cross bar, a rear axle connected to the rear end of said auxiliary frame for limited pivotal movement about a vertical and a horizontal axis relative to the auxiliary frame, a rack carried by the rear end of said main frame, a gear rotatably supported by said auxiliary frame, meshing with said rack, and a steering post for rotating said gear whereby said main frame may be steered from the rear auxiliary frame, and means connecting said rear axle and said main frame for guiding the rear axle in unison with the steering of the main frame.

7. In a tractor, the combination of a main frame, having an arcuate rear end, an auxiliary frame pivotally connected to and extending rearwardly from the main frame, a rack carried by said arcuate rear end, a bearing carried by said auxiliary frame, a shaft rotatably supported by said bearing, a gear upon said shaft and meshing with said rack, said gear provided with downwardly inclining portion having teeth upon its periphery, a rearwardly and upwardly extending steering post, a gear upon said steering post meshing with said teeth upon the periphery of the downwardly extending portion of said gear for rotating the gear upon rotation of the steering post, and a rear axle pivotally connected at the rear end of said auxiliary frame for limited pivotal movement about a vertical and horizontal axis relative to the frame.

8. In a tractor, the combination of a main frame, having an arcuate rear end, an auxiliary frame pivotally connected to and extending rearwardly from the main frame, a rack carried by said arcuate rear end, a bearing carried by said auxiliary frame, a shaft rotatably supported by said bearing, a gear upon said shaft and meshing with said rack, said gear provided with downwardly inclining portion having teeth upon its periphery, a rearwardly and upwardly extending steering post, a gear upon said steering post meshing with said teeth upon the periphery of the downwardly extending portion of said gear for rotating the gear upon rotation of the steering post, a rear axle pivotally connected at the rear end of said auxiliary frame for limited pivotal movement about a vertical and horizontal axis relative to the frame, a supporting wheel carried by said main spring, and traction wheels carried by said supporting wheels.

9. In a tractor, the combination of a main frame, having an arcuate rear end, an auxiliary frame pivotally connected to and extending rearwardly from the main frame, a rack carried by said arcuate rear end, a bearing carried by said auxiliary frame, a shaft rotatably supported by said bearing, a gear upon said shaft and meshing with said rack, said gear provided with downwardly inclining portions having teeth upon its periphery, a rearwardly and upwardly extending steering post, a gear upon the steering post meshing with said teeth upon the periphery of the downwardly extending portion of said gear for rotating the gear upon rotation of the steering post, a rear axle pivotally connected at the rear end of said auxiliary frame for limited pivotal movement about a vertical and horizontal axis relative to the frame, a supporting wheel carried by said main spring, traction wheels carried by said supporting wheels, and crossed rods connected to said rear axle and to the rear end of said main frame.

JACOB ESKELIN.